March 4, 1958 D. C. FELT 2,825,812

OPERATING MEANS FOR ELECTRICAL TUNING DEVICES

Filed Oct. 15, 1952 2 Sheets-Sheet 1

INVENTOR.
DAVID C. FELT
BY Darby & Darby
ATTORNEYS

OPERATING MEANS FOR ELECTRICAL TUNING DEVICES

Filed Oct. 15, 1952 2 Sheets-Sheet 2

INVENTOR.
DAVID C. FELT

BY Darby & Darby

ATTORNEYS

United States Patent Office 2,825,812 Patented Mar. 4, 1958

2,825,812

OPERATING MEANS FOR ELECTRICAL TUNING DEVICES

David C. Felt, Teaneck, N. J., assignor to Allen B. Du Mont Laboratories, Inc., Clifton, N. J., a corporation of Delaware Application October 15, 1952, Serial No. 314,852

7 Claims. (Cl. 250—40)

This invention relates to electrical tuning devices and particularly to novel means for driving the movable elements of such devices to thereby position those elements for selectively converting radio frequency signals into intermediate frequency signals.

More particularly still the invention relates to drive means for electrical tuning devices of the type shown in the copending application of Felt and Nestlerode, Serial No. 314,853, and is disclosed in connection with a tuning device of the type described in detail in that application.

It is an object of the invention to provide a driving means for the movable members of an electrical tuning device which compels simultaneous movement of the frequency determining and tuning members at one stage of operation and permits the movement of the tuning member with respect to the other stationary frequency determining member at another stage of the operation.

Another object is to dispense with the necessity for a plurality of indicator members as employed in the above-mentioned copending application.

It is another object of the invention to provide such an operating means for an electrical tuner arranged to hold the frequency determining member in a stationary position and to couple a driving means to the tuning member for movement thereof within a limited range and with respect to the frequency determining member.

It is a further object of the invention to provide such a device in which the operating means for the circuit disk is positively coupled to that disk and wherein the operating means for the tuning disk is directly coupled to the means for driving that disk without the intervention of belts and pulleys or the like, hereafter called "direct drive."

It is a still further object of my invention to provide an operating means as above-described which is extremely compact and which nonetheless is capable of efficiently performing the functions above-described.

Other objects and features of the invention will be apparent when the following description is considered in connection with the annexed drawings, in which, Figure 1 is a top plan view of a tuner having an operating means constructed in accordance with this invention;

Figure 6:
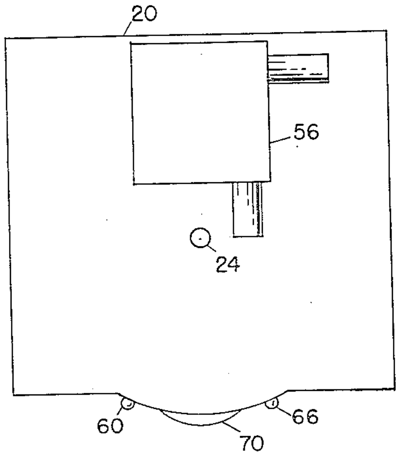
Figure 6 is a top plan view of a modified form of tuner incorporating this invention.
Figure 7:
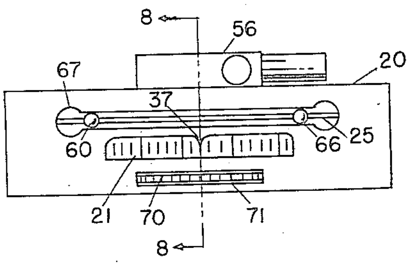
Figure 7 is a front elevational view of the tuner of Figure 6.
Figure 8:
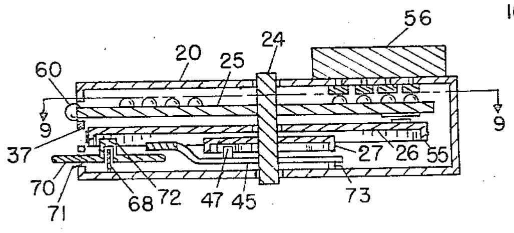
Figure 8 is a vertical cross-sectional view of the device of Figures 6 and 7, the view being taken on the plane of the line 8—8 of Figure 7.
Figure 9:
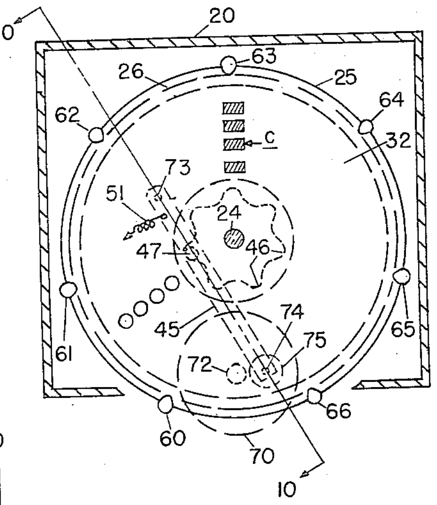
Figure 10:
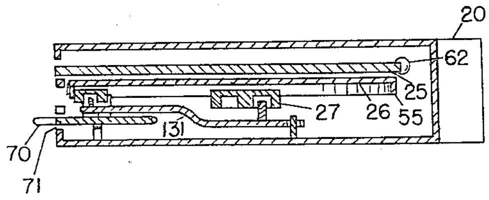

Figure 9 is a horizontal cross-sectional view of the device of Figures 6 through 8, the view being taken on the plane of the line 9—9 of Figure 8; and Figure 10 is a vertical cross-sectional view and is taken on the plane of the line 10—10 of Figure 9.

Referring now to the drawings and particularly to Figures 1 through 5, there is shown therein a tuner which comprises a housing 20 having an opening 21 in its forward wall. Likewise mounted in the forward wall of the housing 20 is a switching or coarse tuning knob 22 and a vernier tuning knob 23. Rotatably mounted at substantially the centers of the top and bottom of the housing 20 is a shaft or spindle 24 to which a circuit disk 25 is rigidly secured. Rotatably mounted on the shaft 24 is a tuning disk 26 which disk lies below and closely adjacent to the circuit disk 25. Fixed to the shaft 24 is a cam 27, the cam being beneath the tuning disk 26. The construction described above provides for a circuit disk 25, tuning disk 26, cam 27 and shaft 24 which are rotatable in unison and for a tuning disk 26 which is rotatable independently of the various parts abovementioned. The circuit disk and tuning disk are substantially identical with those shown in the copending application Serial No. 314,851, differing therefrom only in the aspects hereinafter mentioned.

In this connection, it should be noted that in copending application, Serial Number 314,851, circuit disk 25 is shown to have sets of frequency determining, printed circuit inductors mounted thereon. This is not indicated in this application. The inductors terminate in contacts (unnumbered) indicated by the semi-circles on the upper half of disk 25, Figure 3. Also disclosed in the above mentioned copending application (not shown here), are sets of printed circuit capacitive tuning or shading elements mounted on the upper surface of disk 26 facing corresponding sets of printed circuit inductors on the lower surface of disk 25.

Neither the frequency determining inductors nor the tuning elements or their interdependence will be covered in any great detail since the present application concerns itself solely with the means for operating the device of the above mentioned copending application.

The tuning disk 26 in the present form of the invention has a greater diameter than the circuit disk 25 and is provided with a bevelled rim 28. Since seven sets of frequency determining coils are contemplated in this embodiment of the tuner seven indicia scales 30, 31, 32, 33, 34, 35 and 36 are arranged in equal segments on the bevelled rim 28 of the tuning disk 26. These indicia scales may be calibrated in signal frequencies or designated as television channels or otherwise suitably constructed. A fixed pointer 37 is provided for cooperation with the indicia scales 30 through 36 being made integral with the housing 20 in a position preferably centrally of the opening 21. If desired, the tuning disk 26 may be made of transparent material and a lamp 38 positioned to illuminate the indicia scales from the rear.

Figure 4:
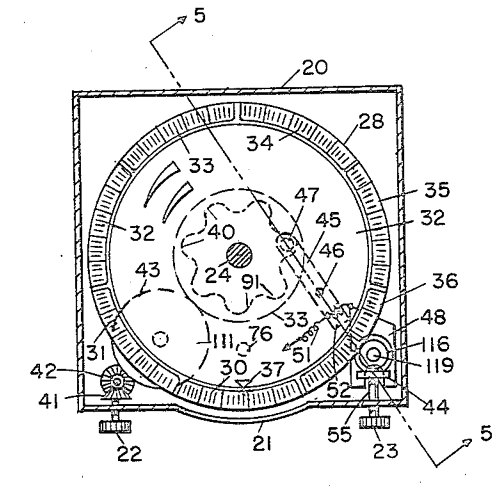
Figure 4 is a horizontal cross-sectional view of the tuner of the preceding figures, the view being taken on the plane of the line 4—4 of Figure 3. This view shows particularly the means for rotating the circuit and tuning disk.
Figure 1:
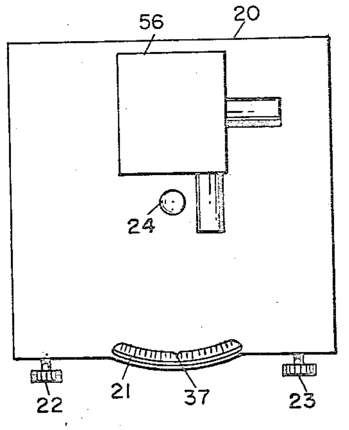
Figure 3:
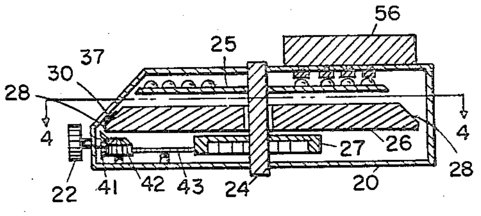
Figure 3 is a vertical cross-sectional view of the device of Figures 1 and 2, the section being taken on the plane of the line 3—3 of Figure 2.
Figure 2:
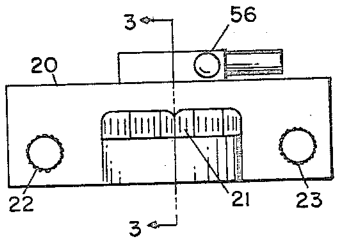
Figure 2 is a front elevation of the tuner of Figure 1.
Figure 5:
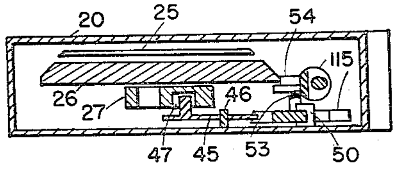
Figure 5 is a vertical cross-sectional view taken on the plane of the line 5—5 of Figure 4 and showing details of the means for rotating the tuning disk.

The cam 27 is arranged with a plurality of inner depressions indicated best in Figure 4 and designated as 40. The number of projections corresponds to the number of sets of frequency determining elements on the circuit disk 25 and also ordinarily to the number of sets of tuning elements on the tuning disk 26. As has been indicated, means are provided to rotate the circuit disk 25 and tuning disk 26 the means being arranged to cause rotation of the circuit disk and tuning disk together at one time and at another time to provide for locking the circuit disk in a predetermined position while permitting limited rotation of the tuning disk with respect thereto. Means for rotating the circuit disk 25 comprises the coarse tuning knob 22 which carries on its shaft a bevelled gear 41. Bevelled gear 41 drives a mating bevelled gear 42. This gear, in turn, through a spur gear thereon, drives the spur gear 43. Gear 43 in turn meshes with teeth provided in the outer periphery of the cam 27. Thus when the coarse tuning knob 22 is operated the cam 27 is rotated and, due to the fixed connections heretofore mentioned, the circuit disk 25 likewise is rotated. This rotation of the elements above-described causes rotation of the tuning disk 26, such rotation resulting from frictional engagement of the spindle 24 and the upper surface of cam 27 with the disk 26.

The fine tuning knob 23 is journalled in the forward portion of the housing 20 and carries on its rearward end, that is, to the rear of the housing 20, a friction drive wheel 44. A cam operated lever 45 is pivoted on a pin 46 fixed to the base of the housing 20. This lever carries at one end a roller 47 which engages with the cam comprising the toothed outline indicated at 40 in Figure 4. Thus the lever is oscillated about the pin 46 as the cam 27 is rotated. At its opposite end lever 45 terminates adjacent a plate 48, the plate being pivoted on a pin 50 which is fixed to the base of the housing 20. A spring 51 urges the lever 45 in a direction to cause roller 47 to bear against the cam surface formed on the inner periphery of the cam 27 and a spring 52 connects the outer end of the lever 45 to the uppermost corner of the plate 48 as seen in Figure 4, thus urging the plate against the end of the lever 45.

Rotatably mounted on a pin 53 fixed in the plate 48 is a drive wheel 54, which drive wheel is always in engagement with the rim of the wheel 44 and has a vertical surface adapted to engage the vertical rim of the tuning disk 26.

The pivot pin 50 for the plate 48 is preferably aligned with the point of engagement of the drive wheel 54 with the rim of the drive wheel 44 so that good driving engagement between wheel 54 and wheel 44 is achieved when the drive plate 48 is pivoted through a limited angle about the pin 50. Further to ensure such good driving engagement the plate 48 is pivoted on the pin 50 through the use of a slot 55 in plate 48.

As will be obvious from the above, when the coarse tuning knob 22 is operated the parts 24, 25 and 27 are rotated so that a set of frequency determining elements is rotated into position to make contact with the electrical circuit unit designated at 56 and at the same time, due to the frictional engagement of the disk 26 with parts 24 and 27, this disk is rotated. During the rotation of the parts mentioned the lever 45 is caused to move in a counterclockwise direction thus pivoting the plate 48 about the pin 50 and preventing engagement of the rim of the wheel 54 with the vertical rim of the disk 26. When the disk 25 has been rotated into a new position with different frequency determining elements in contact with the contacts of the stationary electrical circuit unit 56, the cam follower 47 will lie in a depression 40 of the inner periphery of the cam 27, the spring 51 causing the clockwise rotation of lever 45 to the position described. Spring 52 causes the plate 48 to pivot about the pin 50 until the rim of drive wheel 54 bears against the rim of the disk 26. When this condition obtains, movement of the fine tuning knob 23 will cause rotation of the tuning disk 26. At the same time the position of roller 47 in a depression in the inner periphery of the cam 27 will hold the circuit or frequency determining disk and prevent it from rotating with the tuning disk despite the frictional contact existing between these disks as previously described.

In Figures 6 through 10 I show another arrangement of driving means for a tuner which accomplishes the results set forth above but in which the driving gears are eliminated and the circuit or frequency determining disk is directly manually rotated. In this form of the invention no operating knob such as the knob 22 is provided and in addition the fine tuning knob 23 is replaced by a similar knob hereinafter described in detail which is mounted on a vertical instead of a horizontal axis.

In Figures 6 through 10 the same reference characters have been used for all similar parts as were used in Figures 1 through 5 and only the parts which are materially different have been given new reference characters.

Referring now to Figures 8 and 9, it will be seen that the circuit disk 25 is provided with a plurality of projections or knobs 60 through 66, these knobs being preferably placed midway between the coil or frequency determining element sets so that when a knob is at either side of a slotted opening 67 in the forward wall of the housing 20 a coil set will be in contact with the contacts of the stationary electrical circuit unit 56 and the mid-point of the corresponding scale segment on the outer rim of the tuning disk 26 will appear opposite the stationary pointer 37 formed as part of the opening 21 in the forward wall of housing 20.

Rotatably mounted on a pin 68 fixed to the bottom wall of the housing 20 is a fine tuning thumb wheel 70 which extends outwardly through an opening 71 in the forward wall of housing 20 this opening being located immediately beneath the openings 67 and 21. Thumb wheel 70 is provided with an upwardly extending central portion 72 which lies adjacent to but out of contact with the interior surface of the rim of the tuning disk 26.

In this construction a lever 45 similar to that above-described is pivoted on a pivot pin 73. Intermediate its ends the lever 45 is provided with a roller type cam follower 47. Likewise, a spring 51 urges the cam follower 47 against the inner peripheral cam surface of the cam 27.

On the end of lever 45 remote from pivoted pin 73 there is provided a pin 74 on which a friction wheel 75 is rotatably mounted. The location of pivot point 73 and the length of the lever 45 are so coordinated with the diameter of the tuning disk 26 and with the diameter of the upper portion 72 of the thumb wheel 70 that when the lever 45 moves in a clockwise direction the surface of the friction wheel 75 engages with the inner portion of the rim of tuning disk 26 and with the outer surface of portion 72 of thumb wheel 70. Therefore, when the cam follower 47 is in a depression in the inner rim of cam 27, the thumb wheel 70 may be effectively rotated to rotate the tuning disk with respect to the electrical circuit unit 56 and with respect to the circuit disk 25. At this time the circuit disk 25 is held stationary because of the detenting action of the cam follower 47 in cooperation with the surface of cam 27 as has previously been described. When the circuit disk 25 is rotated between its operating positions, the cam 27 causes the friction wheel 75 to disengage from mutual contact with the disk 26 and the portion 72 of thumb wheel 70, whereupon the tuning disk 26 is free to be carried along frictionally by the rotating assembly, as has been described above.

While I have described preferred embodiments of the invention, various modifications thereof will be apparent to those skilled in the art and will fall within the scope of the invention.

What is claimed is:

1. In a high frequency electrical tuning device having a frequency determining disk with frequency determining elements spirally wound in a single plane mounted on one surface and a tuning disk having substantially flat tuning elements mounted on the face of said tuning disk facing said frequency determining elements, the combination comprising means to rotate said frequency determining disk, an annular driving rim on said tuning disk having an axially extending surface, a tuning wheel positioned adjacent the surface of said rim, manually operable means for rotating said tuning wheel, manually operable disk driving means for rotating said frequency determining disk, and means for engaging said tuning wheel with the surface of said rim when said frequency determining disk is in predetermined rotary positions only.

2. A device in accordance with claim 1 characterized in that the said direct drive means for said frequency determining disk comprises an operating knob and a gear train terminating in a gear fixed to said frequency determining disk.

3. A device in accordance with claim 1 characterized in that said positive drive means for said frequency determining disk comprises a plurality of knob projections on said disk, said knobs being adapted for ready manual rotation of said disk.

4. A device in accordance with claim 1 characterized in that the means to engage the tuning wheel with the surface of said rim simultaneously causes said tuning wheel to press against said rotating means for said tuning wheel.

5. A device in accordance with claim 1 characterized in that said means to rotate said tuning wheel comprises a tuning wheel extending laterally outwardly from said tuning device and being adapted to be manually rotated.

6. A tuning device comprising a housing, a spindle rotatably positioned in said housing, a circuit disk fixedly attached at the center thereof to said spindle, frequency affecting elements on said circuit disk, an electric circuit unit, means to selectively electrically engage said frequency affecting elements with said circuit unit at predetermined rotary positions of said circuit disk, knob projections extending from the rim of said circuit disk corresponding respectively to said predetermined rotary positions, an opening in said housing through which said knob projections selectively extend when said circuit disk is rotated, said opening being sufficiently wide so that at least two proximal ones of said knobs extend through said opening when said circuit disk is in one of the rotary positions thereof, a tuning disk rotatably positioned at the center thereof on said spindle adjacent said circuit disk, tuning elements on said tuning disk to affect the tuning of said frequency affecting elements when said tuning disk is rotated with respect to said circuit disk, a rim extending laterally from said tuning disk, indicia scales on the outer surface of said rim, an opening in said housing through which a portion of said indicia is visible, an indicator on said housing at said opening near said rim, a drive wheel positioned near the inner surface of said rim, a tuning wheel connected to actuate said drive wheel, an opening in said housing through which a portion of said tuning wheel extends, a pivoted lever arm, a friction wheel rotatably positioned on said arm adjacent said drive wheel and the inner surface of said rim, and a cam fixedly attached to said spindle and having a cam surface thereon positioned to engage said arm, whereby said friction wheel is selectively swung into engagement with said drive wheel and said rim when said circuit disk is in one of its operative positions.

7. In a tuning device having a rotatable frequency determining disk, a cam disk mounted for rotation with said frequency determining disk, a cam surface on said cam disk, positive means for rotating said cam and said disk in unison, a tuning disk mounted coaxially with said frequency determining disk, a friction wheel positioned adjacent the rim of said tuning disk, said friction wheel being mounted on a plate, a manually operable tuning means adapted to frictionally engage said friction wheel, a pivoted lever one end of which engages said cam surface and the other end of which engages said pivoted plate, said lever being spring pressed into engagement with said cam whereby in predetermined positions of said frequency determining disk said friction wheel is caused to engage said tuning disk rim and said tuning disk may be rotated by said manually operable tuning means.

References Cited in the file of this patent

UNITED STATES PATENTS

| | | |
|---|---|---|
| 1,622,499 | Dunn | Mar. 29, 1927 |
| 1,652,691 | Tyrman | Dec. 13, 1927 |
| 2,468,126 | Silver | Apr. 26, 1949 |
| 2,499,573 | Dunn | Mar. 7, 1950 |
| 2,557,234 | Rieth | June 19, 1951 |
| 2,643,361 | Mackey | June 23, 1953 |

FOREIGN PATENTS

| | | |
|---|---|---|
| 541,150 | Germany | Jan. 9, 1932 |
| 702,029 | France | Mar. 27, 1931 |